Patented June 25, 1929.

1,718,287

UNITED STATES PATENT OFFICE.

ROBERT B. MacMULLIN, OF LA SALLE, AND ANTHONY GEORGE, OF NIAGARA FALLS, NEW YORK, ASSIGNORS TO THE MATHIESON ALKALI WORKS, INC., OF NEW YORK, N. Y., A CORPORATION OF VIRGINIA.

MANUFACTURE OF CALCIUM HYPOCHLORITE.

No Drawing.   Application filed August 4, 1926.  Serial No. 127,173.

This invention relates to improvements in the production of calcium hypochlorite. Calcium hypochlorite, that is $Ca(OCl)_2$, in pure form is relatively stable, but calcium chloride if present in substantial amount makes it relatively unstable. This is apparently due to the hygroscopic properties of calcium chloride. This invention provides an improved method of making calcium hypochlorite products of high purity particularly with reference to contamination with calcium chloride, and which has several further important advantages.

According to the present invention a solution or suspension containing caustic soda and lime, the amount of lime being in excess of an amount chemically equivalent to the caustic soda, is chlorinated with the production of calcium hypochlorite. Since the solution or suspension contains calcium chloride after chlorination, the separation of the calcium hypochlorite product is carried out so as to inhibit contamination of the product with calcium chloride. The precipitated calcium hypochlorite may, for example, be filtered and pressed to eliminate the maximum possible amount of mother liquor from the product, or the precipitated calcium hypochlorite may be separated from the mother liquor by filtration and the product so separated treated with sodium hypochlorite to convert any contaminating calcium chloride to calcium hypochlorite, or the chlorinated mixture of lime and caustic soda may be treated with a solution of sodium hypochlorite to convert the calcium chloride present to calcium hypochlorite before separation of the calcium hypochlorite product. By employing an amount of lime in excess of that chemically equivalent to the caustic soda, the yield of calcium hypochlorite may be somewhat increased. In place of caustic soda, other caustic alkalis are also useful in carrying out the invention.

The invention will be illustrated by the following example: 234 pounds of high grade lime (95% $Ca(OH)_2$) and 80 pounds of caustic soda are mixed with 690 pounds of water until all of the caustic soda is dissolved. This mixture is chlorinated until only about 2% of free alkali remains. About 278 pounds of chlorine are required. The temperature during chlorination may range, for example, from 5° C. to 40° C., but it is advantageous to maintain the temperature between about 20° C. and 30° C. Following chlorination, the slurry is filtered and the product so separated dried, without pressing, or better with pressing. The filtrate may be used for bleaching purposes or available chlorine may be recovered from the filtrate by treatment with lime to precipitate basic calcium hypochlorite.

The invention will be further illustrated by the following example: 234 pounds of high grade lime and 80 pounds of caustic soda are mixed with 690 pounds of water and the mixture chlorinated with, for example, about 278 pounds of chlorine, as described in the preceding example. The slurry so produced is mixed with 500 pounds of an aqueous solution of sodium hypochlorite containing, for example, about 29.6% of sodium hypochlorite. The sodium hypochlorite solution may be prepared, for example, by chlorinating a solution of 220 pounds of caustic soda in 261 pounds of water substantially to completion. After thorough agitation, the resulting mixture may be evaporated to dryness to produce a calcium hypochlorite product which may contain about 47% of calcuim hypochlorite, the balance being principally sodium chloride. Instead of evaporating the mixture to dryness, the precipitated calcium hypochlorite may be separated by other means, for example by filtration.

We claim:

1. A process of making calcium hypochlorite which comprises chlorinating a mixture of caustic alkali and lime in the presence of water, the amount of lime being in excess of that chemically equivalent to the caustic alkali, and recovering calcium hypochlorite from the resulting mixture.

2. A process of making calcium hypochlorite which comprises chlorinating a mixture of caustic alkali and lime in the presence of water, the amount of lime being in excess of that chemically equivalent to the caustic alkali, treating the chlorinated mixture with sodium hyprochlorite to convert calcium chloride present to alkali chloride, and thereafter separting calcium hypochlorite.

3. A process of making calcium hypochlorite which comprises chlorinating a mixture of caustic soda and lime in the presence of water, the amount of lime being in excess of that chemically equivalent to the caustic soda, treating the chlorinated mixture with sodium hypochlorite, and separating calcium hypochlorite from the resulting mixture.

4. A process of making calcium hypochlorite which comprises chlorinating a mixture of caustic soda and lime in the presence of water, the amount of lime being in excess of that chemically equivalent to the caustic soda, and treating the chlorinated mixture with sodium hypochlorite.

In testimony whereof we affix our signatures.

ROBERT B. MacMULLIN.
ANTHONY GEORGE.